US007380915B2

(12) United States Patent
Terui

(10) Patent No.: US 7,380,915 B2
(45) Date of Patent: Jun. 3, 2008

(54) INK JET RECORDING HEAD AND PRODUCING METHOD THEREFOR

(75) Inventor: Makoto Terui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 394 days.

(21) Appl. No.: 11/252,545

(22) Filed: Oct. 19, 2005

(65) Prior Publication Data

US 2006/0098050 A1 May 11, 2006

(30) Foreign Application Priority Data

Nov. 9, 2004 (JP) ............................ 2004-324979

(51) Int. Cl.
*B41J 2/05* (2006.01)
*G11B 5/127* (2006.01)

(52) U.S. Cl. .......................................... 347/61; 216/27

(58) Field of Classification Search .................. 347/61; 216/27

See application file for complete search history.

(56) References Cited

U.S. PATENT DOCUMENTS

| | | | |
|---|---|---|---|
| 6,139,761 | A | 10/2000 | Ohkuma |
| 6,467,884 | B1 | 10/2002 | Murooka et al. |
| 6,555,480 | B2 | 4/2003 | Milligan et al. |
| 6,582,053 | B1 | 6/2003 | Terui |
| 7,063,799 | B2 | 6/2006 | Hayakawa et al. |
| 2003/0027426 | A1 | 2/2003 | Milligan et al. |
| 2004/0238485 | A1 | 12/2004 | Hayakawa et al. |
| 2005/0140716 | A1 | 6/2005 | Terui |
| 2005/0140737 | A1 | 6/2005 | Ushijima et al. |
| 2005/0248623 | A1 | 11/2005 | Komuro et al. |

FOREIGN PATENT DOCUMENTS

| | | |
|---|---|---|
| JP | H09-11479 | 1/1997 |
| JP | 2003-53979 | 2/2003 |

OTHER PUBLICATIONS

Chinese Office Action dated Jul. 6, 2007, issued in corresponding Chinese patent application No. 200510126048, with English-language translation.

*Primary Examiner*—An H. Do
(74) *Attorney, Agent, or Firm*—Fitzpatrick, Cella, Harper & Scinto

(57) ABSTRACT

In an ink jet recording head of an excellent discharge ability and a producing method therefor, a lateral wall of an ink supply aperture is covered with a minimum necessary ink-resistant protective film. The ink supply aperture is formed by etching an exposed portion of the substrate, coating the etched portion of the substrate, and alternately repeating the etching and the coating until the etched portion becomes connected with a liquid flow path, and, for a depth a of a recessed portion and for a distance b of adjacent projecting portions, when the depth a is in a range of 1 μm or less and the distance b is in a range of 5 μm or less, a and b satisfy a relation $b/a \geqq 1.7$.

3 Claims, 4 Drawing Sheets

INK JET RECORDING HEAD AND PRODUCING METHOD THEREFOR

BACKGROUND OF THE INVENTION

1. Field of the Invention

The present invention relates to an ink jet recording head and a producing method therefor, and more particularly to a surface shape of an ink supply aperture.

2. Related Background Art

The ink jet recording method is rapidly becoming popular in recent years, owing to its advantages of negligibly low noise when recording, an ability for achieving a high-speed recording and an ability of fixing a recording on so-called plain paper without any particular process.

Among ink jet recording heads, a head in which an ink droplet is discharged perpendicularly to a substrate bearing an ink discharge energy generating element is called a "side shooter recording head", and the present invention relates to an ink supply in such a side shooter recording head.

There will now be explained a general structure of such a side shooter recording head.

FIG. 7 is a schematic perspective view showing a common side shooter ink jet recording head, and FIG. 8 is a cross-sectional view along an ink path of the recording head shown in FIG. 7.

The side shooter ink jet recording head shown in FIGS. 7 and 8 is prepared by forming, by a film forming technology on a silicon substrate, a discharge energy generating portion, a common ink chamber, an ink path, a discharge port 25, etc. to be explained later. In a silicon substrate having such components (device substrate 27), there is formed a penetrating ink supply aperture 29 of an elongated shape. On both sides of the ink supply aperture 29, plural electrothermal converting members 30 are formed at a predetermined pitch in two rows with a mutually displaced relationship by a half pitch, along a conveying direction of a recording material, namely along a longitudinal direction of the ink supply aperture 29, thereby respectively constituting discharge energy generating portions. The device substrate 27 is provided, in addition to such electrothermal converting members 30, with electrode terminals 31 for electrical connection of the electrothermal converting members 30 with a main body of the apparatus and electric wirings (not shown), by a film forming technology. On the device substrate 27, there is formed an orifice plate 33 provided with a common ink chamber 32 communicating with the ink supply aperture 29, plural discharge nozzles 25 respectively opposed to the electrothermal converting members 30, and ink paths 34 communicating with the common ink chamber 32 and the respective discharge nozzles 25. A partition wall 35 is formed between adjacent ink paths 34.

A liquid supplied from the ink supply aperture 29 to each ink path 34 causes, in response to a drive signal applied to the electrothermal converting member 30 corresponding to the ink path 34, boiling by heat generation in the electrothermal converting member 30, and is discharged from the discharge nozzle 25 by a pressure of a thus generated bubble.

In such side shooter recording head, an ink supply for the ink droplet discharge is achieved by forming a penetrating aperture in the substrate (device substrate) bearing an electrothermal converting element serving as a discharge energy generating element.

For forming an ink supply aperture in the device substrate of such ink jet recording head, there has been proposed a method utilizing drilling, laser or sand blasting, or a method of utilizing anisotropic etching as described in Japanese Patent Application Laid-open No. H09-11479.

Also, Japanese Patent Application Laid-open No. 2003-53979 proposes a method of etching a portion exposed on a first surface of the substrate, then coating an etched portion of the substrate and repeating these steps alternately until a fluid channel is formed through the substrate. Such a method is called a Bosch process.

However, an ink supply aperture formation by drilling, laser or sand blasting involves a difficulty that a dimensional precision of the ink supply aperture is difficult to obtain.

Also in case of an ink supply aperture formation by an anisotropic etching, the ink supply apertures will have a trapezoidal cross section (cf. FIG. 8) in case of a silicon substrate of <100> orientation. Therefore, in case of producing a chip for an ink jet recording head with a silicon substrate of such crystalline orientation, it is difficult to reduce the size of such chip whereby a cost reduction becomes very difficult. On the other hand, an ink supply aperture perpendicular to the substrate surface can be obtained in case of a silicon substrate of <110> orientation. However, because such <110> substrate shows a smaller ON-resistance in a semiconductor circuit prepared thereon, a chip size reduction is limited in comparison with a case with the <100> silicon substrate.

Also, an ink supply aperture formation by a Bosch process can provide a substantially vertical ink supply aperture, having a highly precise aperture width and a high aspect ratio. However, repetition of etching steps and deposition steps results in an undulating shape, called scallop pattern, similar to that observed on a scallop shell and as shown in FIG. 1. A depth a of the scallop pattern shown in FIG. 1 corresponds to an amount of side etch in an etching step. Also, a distance b between adjacent projecting points of the scallop pattern corresponds to an etch amount in the etching step, and the amounts a and b are both influenced by an aperture rate of the pattern on the wafer surface, a pattern size and an etching condition.

On the other hand, when an ink supply aperture is formed by a dry etching in a silicon substrate, a silicon crystal face exposed on a lateral wall of the ink supply aperture is not necessarily a (111) plane showing a low etching rate for an alkaline solution. Consequently, in case an alkaline ink is employed in an ink jet recording head having such ink supply aperture, silicon dissolves into the ink. It is therefore necessary to cover the surface with a film resistant to the alkaline ink. However, in case the scallop pattern formed on the etched lateral wall of the ink supply aperture shows significant projections and recesses, it becomes difficult to obtain a sufficient coverage for example on a projecting point of such scallop pattern, as indicated by a circle in FIG. 2. A thicker coating can achieve a sufficient coverage even on such point, but a precise aperture width becomes difficult to obtain in the ink supply aperture. A fluctuation in the width of the ink supply aperture results in a fluctuation in a distance from an end of the ink supply aperture to the electrothermal converting element (heater). Thus, a flow resistance may fluctuate among the nozzles, and an anticipated refill frequency (repeating rate per unit time of a liquid refilling in the liquid flow path after a liquid discharge from the discharge port) may become unattainable.

SUMMARY OF THE INVENTION

In consideration of the foregoing, the present invention can, in an ink supply aperture formation by a Bosch process, cover an entire lateral wall with a minimum necessary protective film, thereby providing an ink jet recording head of an excellent discharge performance and a producing method therefor.

The aforementioned object can be attained, according to the present invention, by an ink jet recording head including a discharge port for discharging ink, a discharge energy generating element for generating an energy to be utilized for discharging the ink from the discharge port, a liquid flow path provided corresponding to the discharge energy generating element and communicating with the discharge port, and an ink supply aperture provided for supplying the liquid flow path with the ink, wherein a lateral wall of the ink supply aperture includes a repeated pattern of projecting and recessed portions with a depth a of a recessed portion and a distance b of adjacent projecting portions, and the depth a is 1 μm or less, the distance b is 5 μm or less and a and b satisfy a relation $b/a \geqq 1.7$.

The present invention allows to cover, in an ink supply aperture formed by a Bosch process, an entire lateral wall having a repeating pattern of projections and recesses with a minimum necessary ink-resistance protective film, thereby obtaining an ink jet recording head having an excellent discharge performance and a high reliability.

DETAILED DESCRIPTION OF THE PREFERRED EMBODIMENTS

In the following an embodiment of the present invention will be explained with reference to the accompanying drawings.

Figure 1:
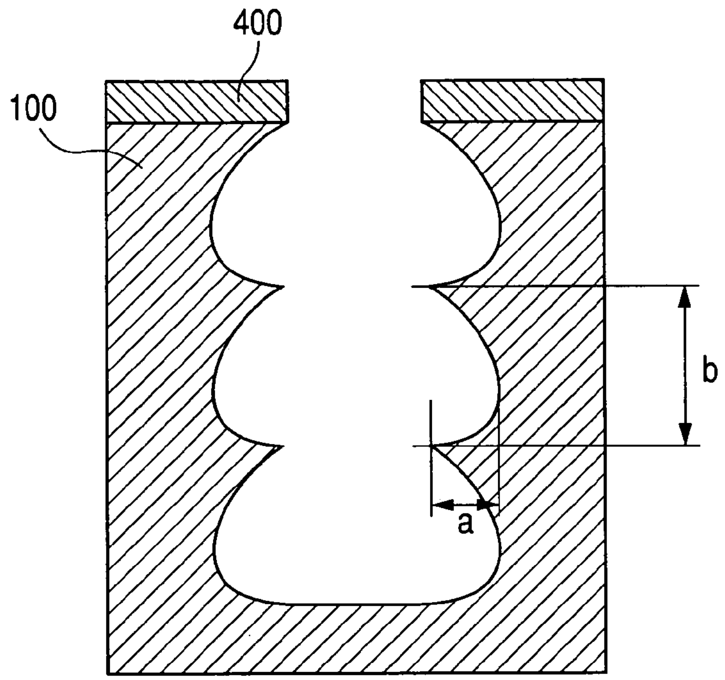
FIG. 1 is a schematic cross-sectional view showing names and dimensions of portions constituting a scallop pattern in an ink supply aperture of an ink jet recording head of the present invention.
Figure 2:
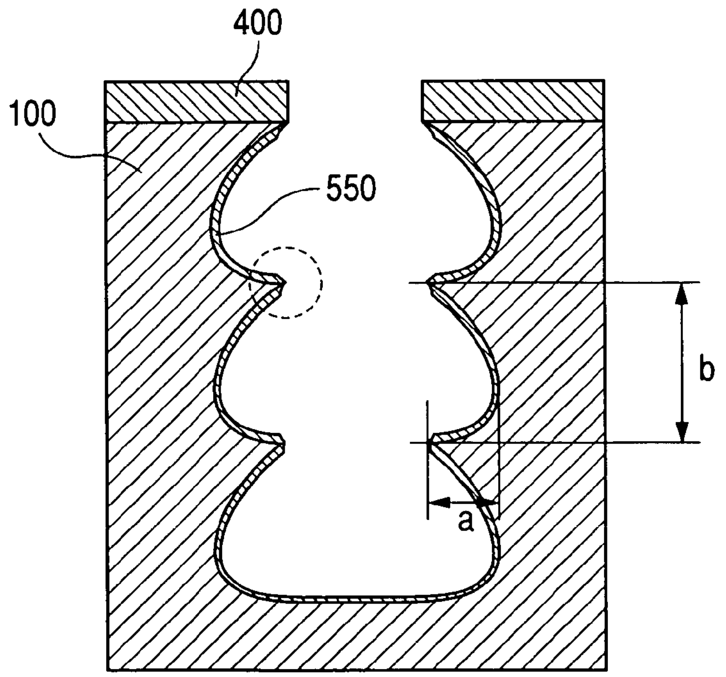
FIG. 2 is a schematic cross-sectional view showing a protective film coating on a surface of the scallop pattern shown in FIG. 1.

In the present embodiment, an ink supply aperture, penetrating through the substrate of the ink jet recording head is basically formed by an etching method of repeating an etching step and a deposition step (so-called Bosch process), and the present embodiment defines a scallop shape (FIG. 1), enabling a sufficient protective film formation on the lateral wall surface of thus etched ink supply aperture. A following experiment was conducted in order to define such shape.

(Experiment)

Figure 3:
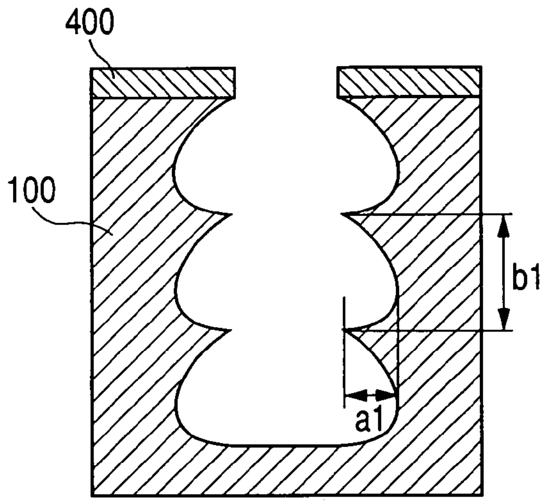
FIG. 3 is a schematic cross-sectional view showing an example of the scallop pattern in the ink supply aperture of the ink jet recording head of the present invention.
Figure 4:
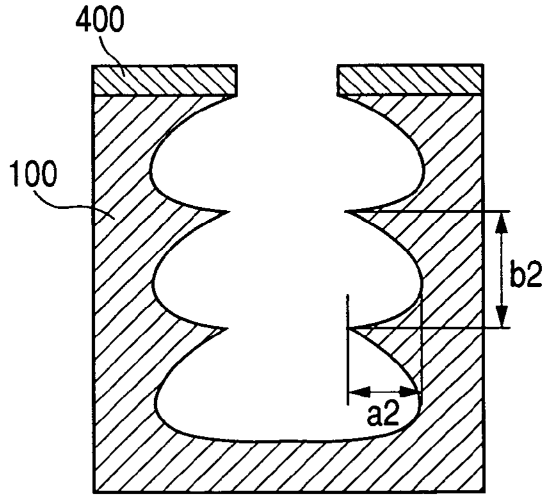
FIG. 4 is a schematic cross-sectional view showing an example of the scallop pattern in the ink supply aperture of the ink jet recording head of the present invention.
Figure 5:
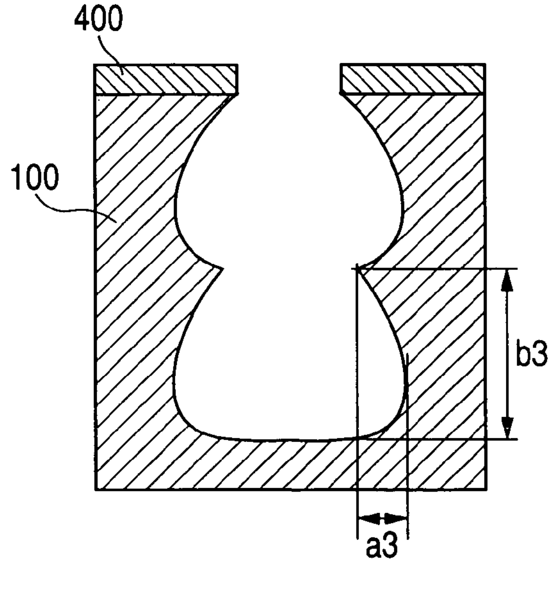
FIG. 5 is a schematic cross-sectional view showing an example of the scallop pattern in the ink supply aperture of the ink jet recording head of the present invention.

After an ink supply aperture was formed by so-called Bosch process of repeating an etching step and a deposition step on a substrate bearing a heat generating resistor, an SiO film was formed by a plasma CVD from the rear surface side of the substrate, so as to cover the lateral wall surface of the ink supply aperture. Dimensions of the scallop pattern on the lateral wall of the ink supply aperture change, according to the conditions of the etching step and the deposition step, as shown in FIGS. 3 to 5. In FIGS. 3 to 5, a depth a of the scallop corresponds to a side etch amount in the etching step, and a distance b between adjacent projecting points of the scallop corresponds to an etching amount in the etching step.

A comparison of FIGS. 3 and 4 indicate $a1<a2$ and $b1=b2$. In a situation of FIG. 4 with a same dimension b and a larger dimension a, the projecting portion in the scallop pattern on the lateral wall of the ink supply aperture becomes sharper whereby the coverage by the protective film is lowered.

A comparison of FIGS. 3 and 4 indicate $a1<a2$ and $b1=b2$. In a situation of FIG. 4 with a same dimension b and a larger dimension a, the projecting portion in the scallop pattern on the lateral wall of the ink supply aperture becomes sharper whereby the coverage by the protective film is lowered.

A comparison of FIGS. 3 and 5 indicate $a1=a3$ and $b1<b3$. In a situation of FIG. 5 with a same dimension a and a larger dimension b, the projecting portion in the scallop pattern on the lateral wall of the ink supply aperture becomes blunter whereby the coverage by the protective film is improved.

Thus an experiment was conducted on the coverage.

Samples were prepared with a dimension a, corresponding to the depth of the scallop pattern, of 1) 0.2 μm, 2) 0.3 μm, 3) 0.4 μm, 4) 0.5 μm, 5) 0.8 μm and 6) 1.0 μm. Also samples were prepared with a dimension b, corresponding to the distance between the adjacent projecting points of the scallop pattern, of 1) 0.5 μm, 2) 1.0 μm, 3) 3.0 μm and 4) 5.0 μm. Samples were prepared by combining the dimensions a with each dimension b. Then an SiO film was formed by plasma CVD from the rear surface side of the substrate with a thickness of about 0.5 μm on the lateral wall of the ink supply aperture, and an orifice plate bearing a liquid flow path and a discharge port was adhered to obtain an ink jet recording head, which was then subjected to a discharge durability test. Results are shown in Tables 1 to 4.

The discharge durability test was conducted under following conditions. The test employed an ink having a composition of ethylene glycol/urea/isopropyl alcohol/black dye/water=5/3/2/3/87 parts. The ink was discharged from the discharge port in response to a signal of a rectangular voltage of 30 V by 30 μs and a frequency of 3 kHz applied to the electrothermal converting member (heater) of the prepared ink jet recording head.

The aforementioned ink contained urea as a humidifying component (for reducing ink evaporation and thus avoiding an ink clogging), and the urea shows a weak alkalinity upon hydrolysis. In case the lateral wall of the ink supply aperture is not protected sufficiently, repeated droplet discharges with such alkaline ink induces a silicon dissolution into the ink, resulting in a cogation (scorched substance) on the heater and eventually leading to a clogging of the liquid flow path by a precipitate whereby the ink discharge becomes impossible. In the present application, a number of repeated discharges to such situation is defined as a durability number.

TABLE 1

| dimension b = 0.5 μm/0.5 μm protective film by plasma CVD | dimension a (μm) | | | | | |
|---|---|---|---|---|---|---|
| | 0.2 | 0.3 | 0.4 | 0.4 | 0.8 | 1.0 |
| discharge durability test | + | + | − | − | − | − |

TABLE 2

| dimension b = 1.0 μm/0.5 μm protective film by plasma CVD | dimension a (μm) | | | | | |
|---|---|---|---|---|---|---|
| | 0.2 | 0.3 | 0.4 | 0.4 | 0.8 | 1.0 |
| discharge durability test | + | + | + | + | − | − |

TABLE 3

| dimension b = 3.0 (μm/0.5 μm protective film by plasma CVD | dimension a (μm) | | | | | |
|---|---|---|---|---|---|---|
| | 0.2 | 0.3 | 0.4 | 0.4 | 0.8 | 1.0 |
| discharge durability test | + | + | + | + | + | + |

TABLE 4

| dimension b = 5.0 μm/0.5 μm protective film by plasma CVD | dimension a (μm) | | | | | |
|---|---|---|---|---|---|---|
| | 0.2 | 0.3 | 0.4 | 0.4 | 0.8 | 1.0 |
| discharge durability test | + | + | + | + | + | + |

The SiO film formed from the rear surface side of the substrate was formed with a thickness of about 0.5 μm on the lateral wall of the ink supply aperture, because of the following reason. A thicker protective film can avoid the silicon dissolution into the ink regardless of the scallop shape, but increases the tolerance in the width of the ink supply aperture, thus influencing the refill frequency. In the ink jet recording head hereafter, the ink supply aperture formed as a penetrating hole in the center of the substrate is required to be made as small as possible in size, along with a reduction in the substrate size for achieving a smaller head and a cost reduction. However, for a smaller width of the ink supply aperture, the flow resistance shows a larger increase by a dimensional change, thus leading to a phenomenon of an abrupt decrease in the refill frequency even by a slight decrease in the width of the ink supply aperture. Therefore, the width of the ink supply aperture requires a stricter tolerance, which requires not only a reduction in the etching tolerance on the ink supply aperture but also a smaller film thickness of the protective film and a tolerance thereof.

In the present embodiment, in consideration of the practical conditions, the SiO film was so formed as to obtain a thickness of about 0.5 μm on the lateral wall of the ink supply aperture.

In Tables 1 to 4, each head showing a failure (−) in the discharge durability test was disassembled and investigated. As a result, there was observed a silicon dissolution into the ink, which was identified as a cause of such failure. Then a relation of this phenomenon with a dimensional ratio of a and b was investigated to provide relations shown in Table 5 within a range that the dimension a is 1.0 μm or less and the dimension b is 5.0 μm or less, indicating a relation $b/a \geqq 1.7$.

TABLE 5

| b/a (bold italic numbers indicate acceptable range in the discharge durability test) | | a | | | | | |
|---|---|---|---|---|---|---|---|
| | | 0.2 | 0.3 | 0.4 | 0.5 | 0.8 | 1 |
| b | 0.5 | ***2.5*** | ***1.7*** | 1.3 | 1.0 | 0.6 | 0.5 |
| | 1 | ***5.0*** | ***3.3*** | ***2.5*** | ***2.0*** | 1.3 | 1.0 |
| | 3 | ***15.0*** | ***10.0*** | ***7.5*** | ***6.0*** | ***3.8*** | ***3.0*** |
| | 5 | ***25.0*** | ***16.7*** | ***12.5*** | ***10.0*** | ***6.3*** | ***5.0*** |

EXAMPLES

In the following, an example of the producing method of the present invention for the ink jet recording head will be explained, with reference to FIGS. 6A to 6F.

Figure 6A:
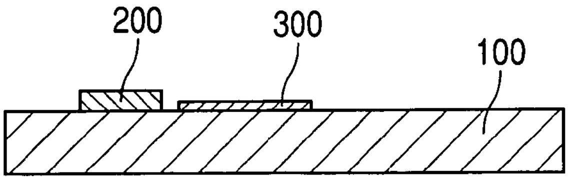
FIGS. 6A, 6B, 6C, 6D, 6E and 6F are views showing steps of a producing method of the present invention for producing an ink jet recording head.

FIG. 6A shows a substrate (base member) of an ink jet recording head. On a surface of a silicon substrate 100, there are provided a heater 200 and an etching stop layer 300. The etching stop layer 300 in the present example was constituted of aluminum. The silicon substrate 100 had a thickness of 200 μm.

Figure 6B:
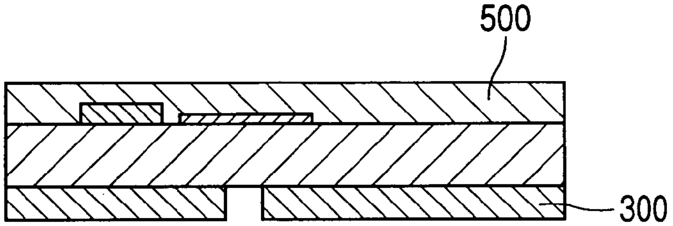

FIG. 6B shows a state where a rear surface of the silicon substrate 100 was provided with an etching mask 400 for forming an ink supply aperture by an anisotropic dry etching in a later step, and a top surface was provided with a surface protecting resist 500. In the present example, a resist OFPR manufactured by Tokyo Oka Co. was employed as the etching mask 400 and the surface protecting resist 500, but other commercial positive photoresists or other materials can also be employed.

Figure 6C:
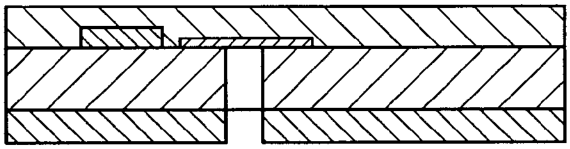

FIG. 6C shows a state where an ink supply aperture was formed in the silicon substrate 100 by dry etching. In the present example, the dry etching was conducted with an ICP etching apparatus, model 601E manufactured by Alcatel Co., and so-called Bosch process was conducted by alternately repeating an etching with $SF_6$ and a deposition (also called coating) with $C_4F_8$.

In this operation, the anisotropic dry etching for forming the ink supply aperture is stopped by the aluminum etching stop layer 300 formed by plasma CVD.

In the present example, in an observation of the shape of the lateral wall of the ink supply aperture formed by the Bosch process, the adjacent projecting points of the scallop pattern had a distance of about 1 μm in the thickness direction of the silicon substrate 100. Also the scallop pattern had a depth of the recess of about 0.3 μm in a direction perpendicular to the thickness direction of the silicon substrate 100.

Conditions of the etching were a plasma source power of 2200 W, a substrate bias power of 120 W, $SF_6$/500 ml/min (normal)/5.0 s/ca. $5.0E^{-2}$ mbar, and $C_4F_8$/150 ml/min(normal)/2.0 s/ca. $1.6E^{-2}$ mbar. Also there were employed a wafer temperature of −5° C. and a total etching time of 20 min.

Figure 6D:
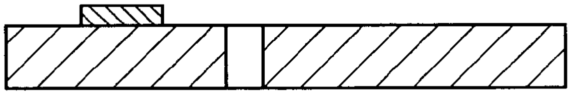

FIG. 6D shows a state where the aluminum etching stop layer 300 was removed and then the etching mask 400 and the surface protective resist 500 were stripped off. The aluminum was removed with a mixed acid C-6 (manufactured by Tokyo Oka Co.), and the etching mask 400 and the surface protecting resist 500 were stripped with a stripper 1112A manufactured by Shipley Far East Co.

Figure 6E:
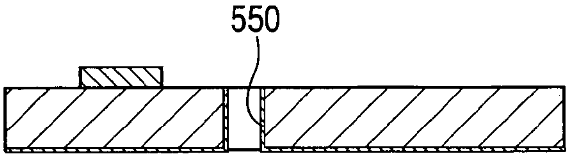

FIG. 6E shows a state where a SiO film was formed with a thickness of 0.5 μm by plasma CVD from the rear surface side of the silicon substrate 100. This SiO film is formed on the rear surface of the silicon substrate 100 and also as a protective film 550 on the lateral wall of the ink supply aperture 800. On the lateral wall of the ink supply aperture, since the scallop pattern has a distance of about 1 μm between the adjacent projecting points and a depth of recess of about 0.3 μm as described above, the protective film 550 as thin as 0.5 μm can sufficiently cover the projecting points of the scallop pattern.

Figure 6F:
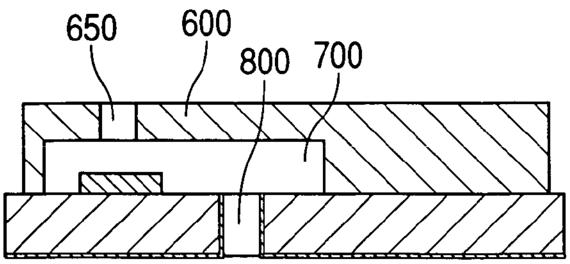
Figure 7:
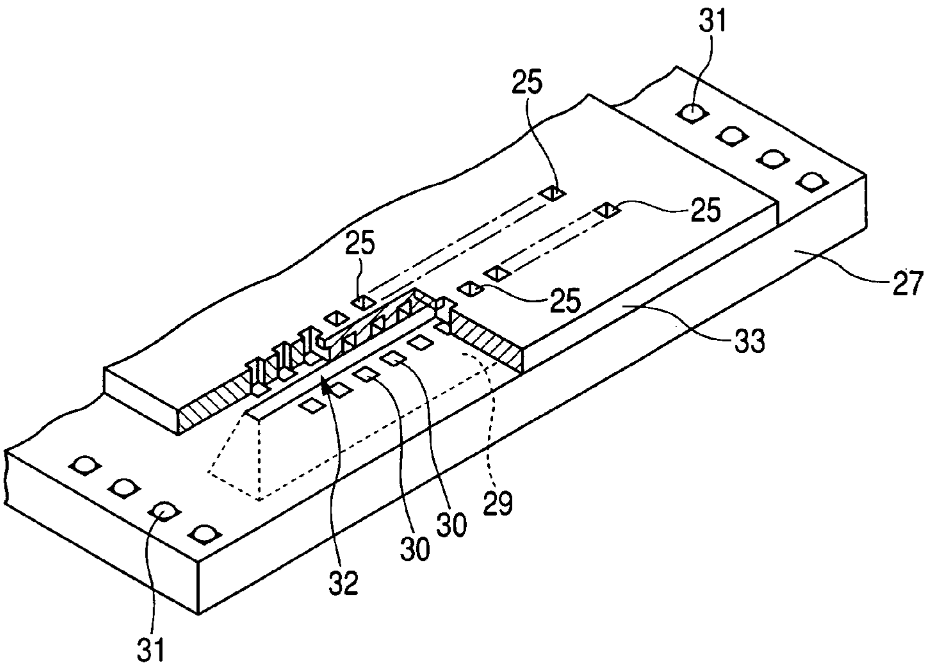
FIG. 7 is a schematic perspective view showing a general side shooter ink jet recording head.
Figure 8:
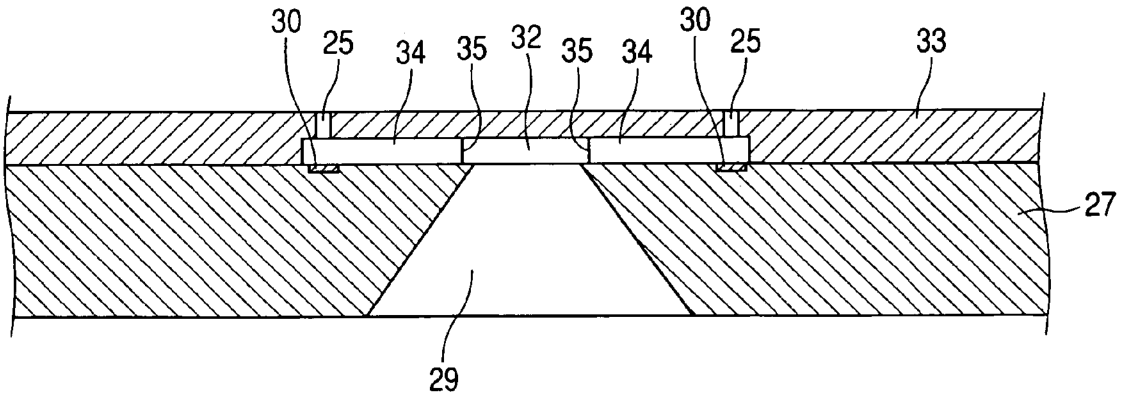
FIG. 8 is a cross-sectional view of the recording head shown in FIG. 7, along an ink flow path.

FIG. 6F shows a state where an orifice plate 600 in which a liquid flow path 700 and a discharge port 650 are formed is adhered with an adhesive.

An ink jet recording head, prepared through the steps shown in FIGS. 6A to 6F, was mounted on a recording apparatus and was used in a recording operation with an alkaline ink. As a result, a stable printing operation was possible and a high-quality print was obtained.

This application claims priority from Japanese Patent Application No. 2004-324979 filed Nov. 9, 2004, which is hereby incorporated by reference herein.

What is claimed is:

1. An ink jet recording head comprising:

a discharge port for discharging ink;

a discharge energy generating element for generating energy to be utilized for discharging the ink from the discharge port;

a liquid flow path provided corresponding to the discharge energy generating element and communicating with the discharge port; and an ink supply aperture provided for supplying the liquid flow path with the ink, wherein a lateral wall of the ink supply aperture includes a repeated pattern of projecting and recessed portions with a depth a of a recessed portion and a distance b of adjacent projecting portions, and when the depth a is in a range of 1 μm or less and the distance b is in a range of 5 μm or less, a and b satisfy a relation $b/a \geqq 1.7$.

2. A method for producing an ink jet recording head including a discharge port for discharging ink, a discharge energy generating element for generating energy to be utilized for discharging the ink from the discharge port, a liquid flow path provided corresponding to the discharge energy generating element and communicating with the discharge port, and an ink supply aperture provided for supplying the liquid flow path with the ink, wherein the method comprises:

an etching step of forming a lateral wall of the ink supply aperture by etching an exposed portion of the substrate, coating the etched portion of the substrate, and alternately repeating the etching and the coating until the etched portion becomes connected with the liquid flow path, wherein for a depth a of a recessed portion and for a distance b of adjacent projecting portions, when the depth a is in a range of 1 μm or less and the distance b is in a range of 5 μm or less, a and b satisfy a relation $b/a \geqq 1.7$.

3. A method for producing an ink jet recording head comprising:

a step of forming a discharge energy generating element, for generating energy to be utilized for discharging ink, on a surface of a substrate;

a step of forming an ink flow path corresponding to the discharge energy generating element, with a soluble resin on the surface of the substrate;

a step of forming a covering resin layer on the soluble resin layer;

a step of forming an ink discharge port communicating with the ink flow path in the covering resin layer; and a step of forming an ink supply aperture communicating with the ink flow path in the covering resin layer, wherein the ink supply aperture is formed by etching an exposed portion of the substrate, coating the etched portion of the substrate, and alternately repeating the etching and the coating until the etched portion becomes connected with the liquid flow path, and for a depth a of a recessed portion and for a distance b of adjacent projecting portions, when the depth a is in a range 1 μm or less and the distance b is in a range of 5 μm or less, a and b satisfy a relation $b/a \geqq 1.7$.

* * * * *

UNITED STATES PATENT AND TRADEMARK OFFICE

CERTIFICATE OF CORRECTION

PATENT NO. : 7,380,915 B2
APPLICATION NO. : 11/252545
DATED : June 3, 2008
INVENTOR(S) : Terui It is certified that error appears in the above-identified patent and that said Letters Patent is hereby corrected as shown below:

<u>COLUMN 2</u>:
Line 10, “involves a difficulty that” should read --poses a problem in that--.

<u>COLUMN 3</u>:
Line 18, “allows to” should read --can--.

<u>COLUMN 4</u>:
Line 15, “of” should read --between--, and “indicate” should read --indicates--.
Line 20, “of” should read --between--, and “indicate” should read --indicates--.
Line 25, “of” should read --between--, and “indicate” should read --indicates--.

<u>COLUMN 5</u>:
Table 3, “dimension b = 3.0 (μm/0.5μm” should read --dimension b = 3.0 μm/0.5 μ— --.
Line 61, “so formed” should read --formed so--.

Signed and Sealed this

Third Day of March, 2009

JOHN DOLL
*Acting Director of the United States Patent and Trademark Office*